(12) United States Patent
Dölker

(10) Patent No.: US 9,909,518 B2
(45) Date of Patent: Mar. 6, 2018

(54) METHOD FOR CONTROLLING THE SPEED OF AN INTERNAL COMBUSTION ENGINE

(71) Applicant: MTU Friedrichshafen GmbH, Friedrichshafen (DE)

(72) Inventor: Armin Dölker, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/104,048

(22) PCT Filed: Dec. 8, 2014

(86) PCT No.: PCT/EP2014/003283
§ 371 (c)(1),
(2) Date: Jun. 13, 2016

(87) PCT Pub. No.: WO2015/086141
PCT Pub. Date: Jun. 18, 2015

(65) Prior Publication Data
US 2016/0312726 A1   Oct. 27, 2016

(30) Foreign Application Priority Data

Dec. 13, 2013  (DE) .................. 10 2013 021 523

(51) Int. Cl.
*F02D 41/00*  (2006.01)
*F02D 31/00*  (2006.01)
(Continued)

(52) U.S. Cl.
CPC ......... *F02D 41/107* (2013.01); *F02D 31/007* (2013.01); *F02D 41/0025* (2013.01);
(Continued)

(58) Field of Classification Search
CPC .............. F02D 41/107; F02D 41/0025; F02D 41/3005; F02D 41/0205; F02D 41/005; F02D 41/1456; F02D 41/1458; F02D 41/38; F02D 41/14; F02D 41/3818; F02D 41/3827; F02D 31/007; F02D 31/001;
(Continued)

(56) References Cited

U.S. PATENT DOCUMENTS 5,444,627 A *  8/1995  Sandborg ................ F02D 41/24
                                                  123/357
7,352,072 B2 *  4/2008  Dolker ................... F02D 31/007
                                                  123/179.3
(Continued)

FOREIGN PATENT DOCUMENTS

DE          10004001 A1     8/2001
DE          10038990 A1     2/2002
(Continued)

*Primary Examiner* — Lindsay Low
*Assistant Examiner* — George Jin
(74) *Attorney, Agent, or Firm* — Lucas & Mercanti, LLP; Klaus P. Stoffel

(57) ABSTRACT

A method for controlling the speed of an internal combustion engine and a speed control circuit for carrying out the method. For controlling, fuel energy is used as an output variable. The control units are calculated in accordance with a stationary proportion gain which is calculated proportionally to the fuel energy and inversely proportional to the engine speed.

11 Claims, 6 Drawing Sheets

(51) Int. Cl.
*F02D 41/10* (2006.01)
*F02D 41/14* (2006.01)
*F02D 41/30* (2006.01)
*F02D 19/06* (2006.01)

(52) U.S. Cl.
CPC ......... *F02D 41/14* (2013.01); *F02D 41/1458* (2013.01); *F02D 41/3005* (2013.01); *F02D 19/06* (2013.01); *F02D 2041/1409* (2013.01); *F02D 2041/1422* (2013.01); *F02D 2200/0611* (2013.01); *F02D 2200/101* (2013.01); *F02D 2250/18* (2013.01); *Y02T 10/36* (2013.01)

(58) Field of Classification Search
CPC .... F02D 31/009; F02D 19/06; F02D 19/0607; F02D 2041/1422; F02D 2041/1409; F02D 2041/142; F02D 2041/1434; F02D 2041/1436; F02D 2200/101; F02D 2200/0611; F02D 2250/18; F02D 2250/24; F02D 2250/26
See application file for complete search history.

(56) References Cited

U.S. PATENT DOCUMENTS

| | | | |
|---|---|---|---|
| 9,273,620 B2* | 3/2016 | Klaser-Jenewein | F02D 29/06 |
| 2003/0172904 A1* | 9/2003 | Kustosch | F02D 41/0225 |
| | | | 123/339.21 |
| 2010/0256890 A1* | 10/2010 | Baldauf | F02D 29/06 |
| | | | 701/102 |
| 2011/0079197 A1* | 4/2011 | Stewart | F02D 35/023 |
| | | | 123/399 |
| 2013/0024094 A1* | 1/2013 | Shaver | F02D 19/088 |
| | | | 701/104 |
| 2016/0312726 A1* | 10/2016 | Dolker | F02D 31/007 |

FOREIGN PATENT DOCUMENTS

| | | |
|---|---|---|
| DE | 102004023993 A1 | 12/2005 |
| WO | 2011000474 A1 | 1/2011 |
| WO | 2011082373 A1 | 7/2011 |

* cited by examiner

METHOD FOR CONTROLLING THE SPEED OF AN INTERNAL COMBUSTION ENGINE

The present application is a 371 of International application PCT/EP2014/003283, filed Dec. 8, 2014, which claims priority of DE 10 2013 021 523.4, filed Dec. 13, 2013, the priority of these applications is hereby claimed and these applications are incorporated herein by reference.

BACKGROUND OF THE INVENTION

The present invention relates to a method for controlling the speed of an internal combustion engine and a closed-loop speed control system for carrying out the method.

The speed of an internal combustion engine, which refers to the frequency of the rotation of the internal combustion engine per unit of time, is generally controlled during operation, in particular held constant during certain periods of time. For this purpose, a speed controller is used, which influences the operation of the internal combustion engine by presetting a correcting variable in such a way that the speed is preferably held constant at the predefined level which corresponds to a set speed, wherein disturbances are reduced. Different kinds of controllers are known, whose behavior is determined via controller parameters and may be influenced via their selection.

The publication DE 10 2004 023 993 A1 describes a method for controlling the speed of an internal combustion engine generator unit with a clutch during the starting process. In this method, after the startup of the first run-up ramp, when it is detected that the clutch has engaged, a switch is made from a first parameter set to a second parameter set, whereupon the first parameter set is deactivated. In the second parameter set, a second run-up ramp is set, which determines the presetting of the set speed.

In the described method, controller parameters are thus switched as a function of a clutching signal. This clutching signal must be available as an external signal. The correcting variable of the described speed controller is the fuel injection quantity. Thus, a use in systems with multiple fuels is not readily possible.

SUMMARY OF THE INVENTION

A method is thus described via which the engine speed of an internal combustion engine, in particular of an internal combustion engine having a common-rail injection system, may be controlled, even if one or multiple fuels of different types are injected per cylinder. In this case, the fuel energy per injection is used as the output variable of the speed controller or as the correcting variable of the closed-loop speed control system, so that the use is possible in systems using two or more fuels. The controller parameters are tracked via internally available signals, for example, the engine speed, the fuel energy, and the speed control deviation. Furthermore, a use of the load signal for improving the speed controller dynamic response may be used. Fuel energy may be understood to mean the energy content of the fuel per injection which is typical for a fuel type.

The described speed controller may automatically be adjusted to the operating point-dependent behavior of the controlled system. A better dynamic response of the closed-loop speed control system is achieved via a calculation of the proportional coefficient as a function of the speed control deviation and via use of the load signal.

It should be noted that the total fuel energy is used as the correcting variable of the speed controller, not the setpoint torque or the injection quantity, as is the case with previously known speed controllers.

The provided method collectively has the following features, at least in its embodiment:

The closed-loop speed control system is based on fuel energy; i.e., the correcting variable of the closed-loop speed control system is the total fuel energy injected per cylinder for a combustion process. The controller behavior is calculated as a function of controller parameters. In this case, a stationary proportional coefficient is calculated proportionally to the fuel energy, and inversely proportionally to the engine speed. The stationary proportional coefficient may be limited downward.

The controller behavior may furthermore be adjusted as a function of a second controller parameter, the dynamic proportional coefficient, wherein the dynamic proportional coefficient is also a function of the speed control deviation.

The proportionality factor of the stationary proportionality coefficient is made up of two multipliers, wherein a first multiplier is a function of the application and has the value 2 for the ship application and the value 1 for the generator application.

A second multiplier mirrors a loop gain, which is presettable by the operator, of the open-loop speed control system, and is independent of the application.

The proportional component of the speed controller is calculated as a function of the dynamic proportional coefficient.

The integrating component of the speed controller is calculated as a function of the stationary proportional coefficient.

The differential component of the speed controller is calculated as a function of the stationary proportional coefficient.

Another controller parameter, the rate-action time, is tracked linearly via the fuel energy for calculating the differential component.

To improve the dynamic response of the speed controller, a fuel energy load signal may be added to an output signal of the speed controller, wherein the fuel energy load signal is calculated from a system signal which is generated when load switching occurs.

The dynamic proportional coefficient is a function of the speed control deviation and improves the dynamic response of the closed-loop speed control system.

The method may be used in a closed-loop speed control system, in particular also in systems in which two or more fuels of different kinds are injected for a combustion operation (diesel, gasoline, . . . ).

The provided method has a range of advantages, at least in some of the embodiments. Since the correcting variable of the closed-loop speed control system is the total fuel energy, the closed-loop speed control system may be used in engines in which two or more fuels are also injected. By tracking the stationary proportional coefficient via the fuel energy and the engine speed, the operating point-dependent stationary gain of the engine is inverted, and the speed controller is thus adjusted to the controlled system in such a way that the behavior of the closed-loop speed control system becomes largely independent of the operating point. In addition, an improvement of the dynamic behavior of the closed-loop speed control system through the use of the dynamic proportional coefficient, which is a function of the speed control deviation, during the calculation of the proportional component, and an improvement of the dynamic behavior of the closed-loop speed control system by applying a load signal-fuel energy to the output of the PI(DT$_1$) speed controller, are possible.

Additional advantages and embodiments of the present invention result from the description and the attached drawings.

It is to be understood that the aforementioned features and the features to be explained hereinafter are applicable not only in each specified combination, but also in other combinations or alone, without departing from the scope of the present invention.

The present invention is schematically depicted in the drawing based on exemplary embodiments and is described in greater detail below with reference to the drawing.

DETAILED DESCRIPTION OF THE INVENTION

Figure 1:
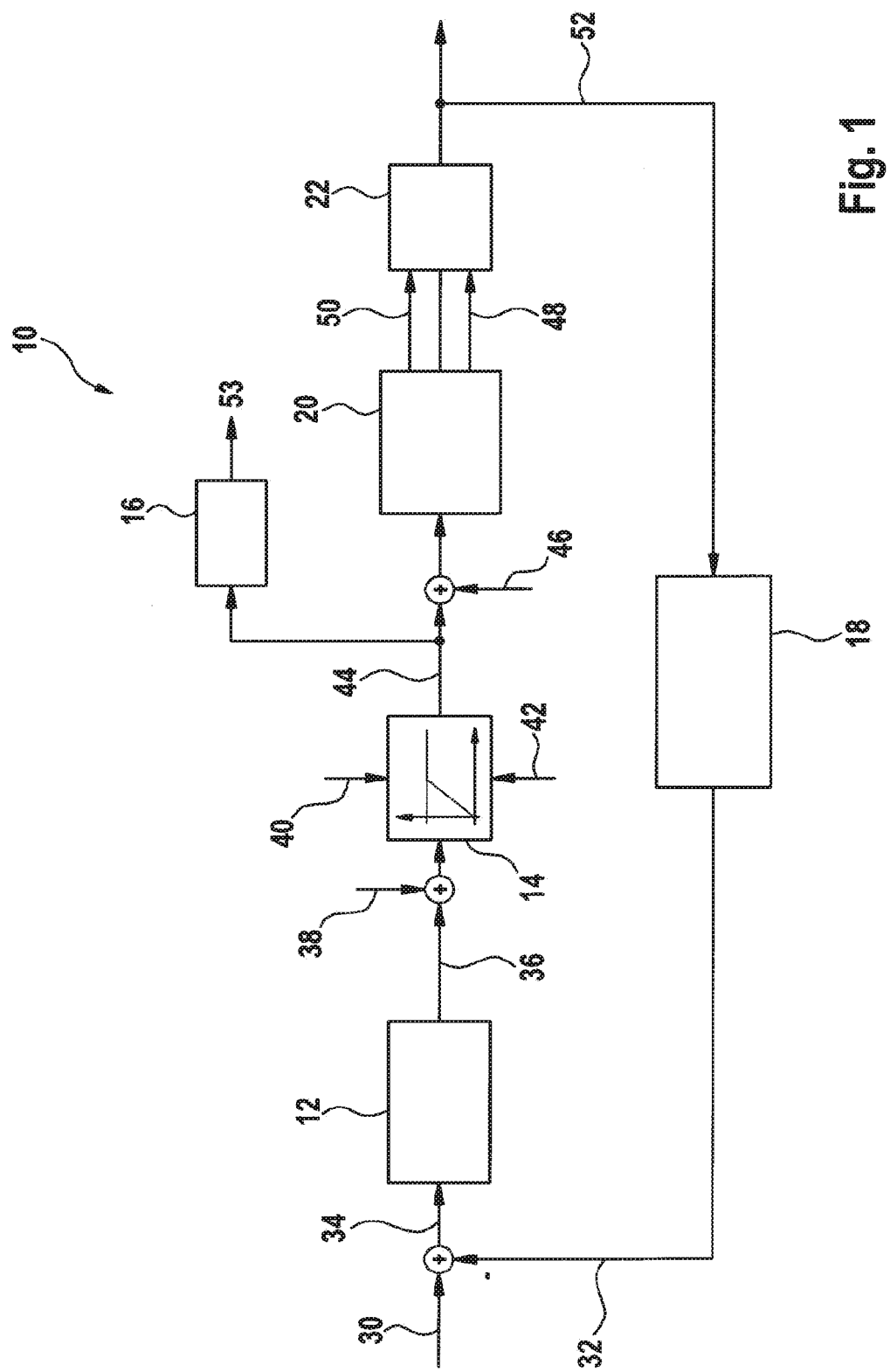
FIG. 1 shows one embodiment of a closed-loop speed control system for carrying out the provided method.

FIG. 1 depicts a closed-loop speed control system in a block diagram, which is collectively designated by the reference numeral 10. This closed-loop speed control system 10 functions based on fuel energy. The depiction shows a controller 12, in this case a PI(DT$_1$) controller, a block 14 for limiting fuel energy, a filter 16, a speed filter 18, an engine management 20, and an internal combustion engine 22. Instead of a PI(DT$_1$) controller, a PI controller, PID controller, or (PID) T$_1$ controller may in particular also be used.

The input signal of the closed-loop speed control system 10 is the set speed 30. The difference between this set speed 30 and the measured engine speed 32 constitutes the speed control deviation 34. The speed control deviation 34 is the input variable of the PI(DT$_1$) speed controller 12. The output variable of the PI(DT$_1$) speed controller is the PI(DT$_1$) fuel energy 36, which is related to an injection for a combustion operation of a cylinder of the internal combustion engine. The load signal-fuel energy 38 is added to the output variable 36 of the speed controller 12. This addition constitutes a disturbance-variable compensation. It is used to improve the dynamic response of the speed controller 12. The sum of the speed controller output 36 and the load signal-fuel energy 38 is subsequently limited upward to the maximum fuel energy 40 and downward to the negative fuel frictional energy 42 per cylinder via the block 14.

In this case, the maximum fuel energy 40 is a function of the engine speed, the charge air pressure, and other variables. The limited fuel energy 44 constitutes the correcting variable of the closed-loop speed control system and is likewise related to an injection. The fuel frictional energy 46 is subsequently added to the limited fuel energy. Fuel frictional energy 46 may be understood to be the fuel energy which corresponds to the frictional losses of the internal combustion engine. In this case, frictional losses are inter alia frictional losses in the cylinders of the internal combustion engine. The sum of the required fuel energy is finally transferred to the engine management 20 and is converted by it into the injection quantity. In a diesel injection system, this is the injection quantity 48, and in an injection system with diesel and gasoline injection (dual-fuel injection), it is also the gasoline injection quantity 50. The engine speed 52 is detected and filtered with the aid of the speed filter 18. The output variable of the speed filter 18 is the measured speed 32.

Figure 2:
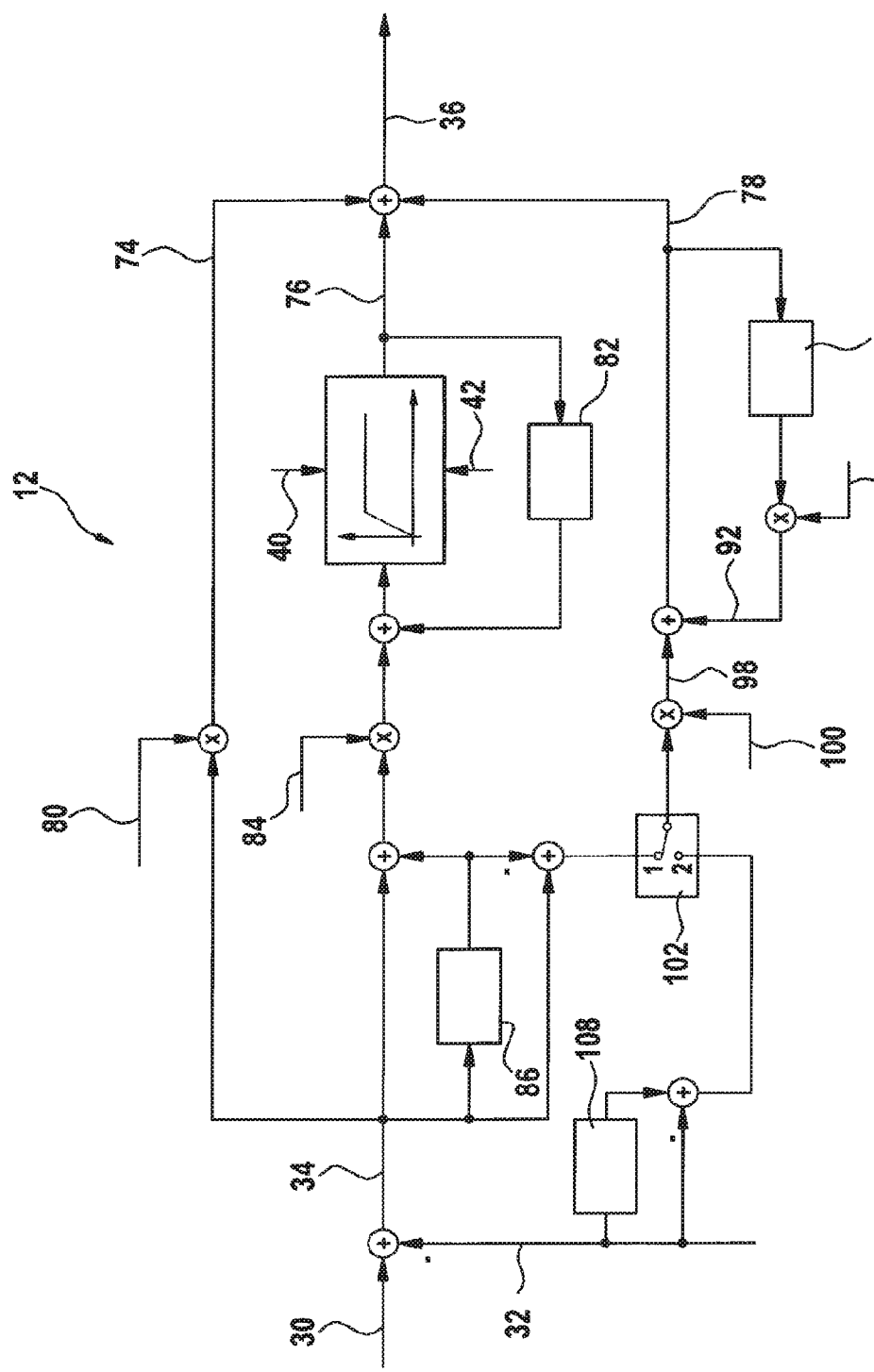
FIG. 2 shows a discrete algorithm of a PI(DT$_1$) speed controller.

FIG. 2 shows the time-discrete algorithm of the PI(DT$_1$) speed controller, which is collectively designated by the reference numeral 12. The output variable 36 of the speed controller algorithm is a sum of three components: the proportional component 74, the integrating component 76, and the DT$_1$ component 78. In this case, the proportional component 74 constitutes the product of the speed control deviation 34 and the so-called dynamic proportional coefficient 80. The dynamic proportional coefficient 80 is a controller parameter of the speed controller algorithm; the calculation of this parameter is depicted in detail in FIG. 3.

The integrating component 76 of the speed controller, the I component, constitutes the sum of an instantaneous limited integrating component delayed by one scanning step (delay element 82) and the product of the gain 84 and the sum of the instantaneous speed control deviation 34 delayed by one scanning step (delay element 86). In this case, the integrating component of the speed controller is limited upward to the maximum fuel energy 40 and downward to the negative fuel frictional energy 42.

The calculation of the DT$_1$ component 78 is depicted in the lower portion of FIG. 2. The DT$_1$ component 78 is obtained as the sum of two products. The first product 92 results from the multiplication of the factor 94 by the DT$_1$ component 78 delayed by one scanning step (delay element 96). The second product 98 is obtained from the multiplication of the factor 100 by the output of a switch 102. Depending on the position of the switch 102, the factor 100 is either multiplied by the difference between the instantaneous speed control deviation 34 and the speed control deviation delayed by a scanning step (delay element 86), (switch position 1), or by the difference between the measured engine speed delayed by one scanning step (delay element 108) and the instantaneously measured engine speed 32 (switch position 2).

In this case, the switch position 2 is always favored if the engine set speed 30 does not change, or changes only slightly, as is the case, for example, in generator applications. The gains 84 and 100 of the I component or the DT$_1$ component are functions of the so-called stationary proportional coefficient kpStat, while the proportional component is a function of the dynamic proportional coefficient 80. The calculation of the stationary proportional coefficient kpStat takes place according to:

$$kp\text{Stat}=(f*v*E^I_{target})/n_{actual}$$

Here, the measured engine speed $n_{actual}$ is indicated by the reference numeral 32, and the integrating component $E^I_{target}$ is indicated by the reference numeral 76. The stationary proportional coefficient is thus proportional to the integrating component $E^I_{target}$ and inversely proportional to the measured engine speed $n_{actual}$. The proportionality factor is the product of two multipliers. The first multiplier is the factor f, and the second multiplier is the closed-loop gain v.

The factor f is a function of the application. In the ship application, f assumes the value 2, and in the generator application, it assumes the value 1. The closed-loop gain v may be preset by the operator; in this case, it is the dimensionless closed-loop gain of the open-loop speed control system. If v assumes large values, the dynamic response of the closed-loop speed control system is large; on the other hand, if v assumes small values, the dynamic response of the closed-loop speed control system is small. The stationary proportional coefficient kpStat is limited downward to the presettable minimal proportional coefficient kpmin:

$$kpStat \geq kpmin$$

Figure 3:
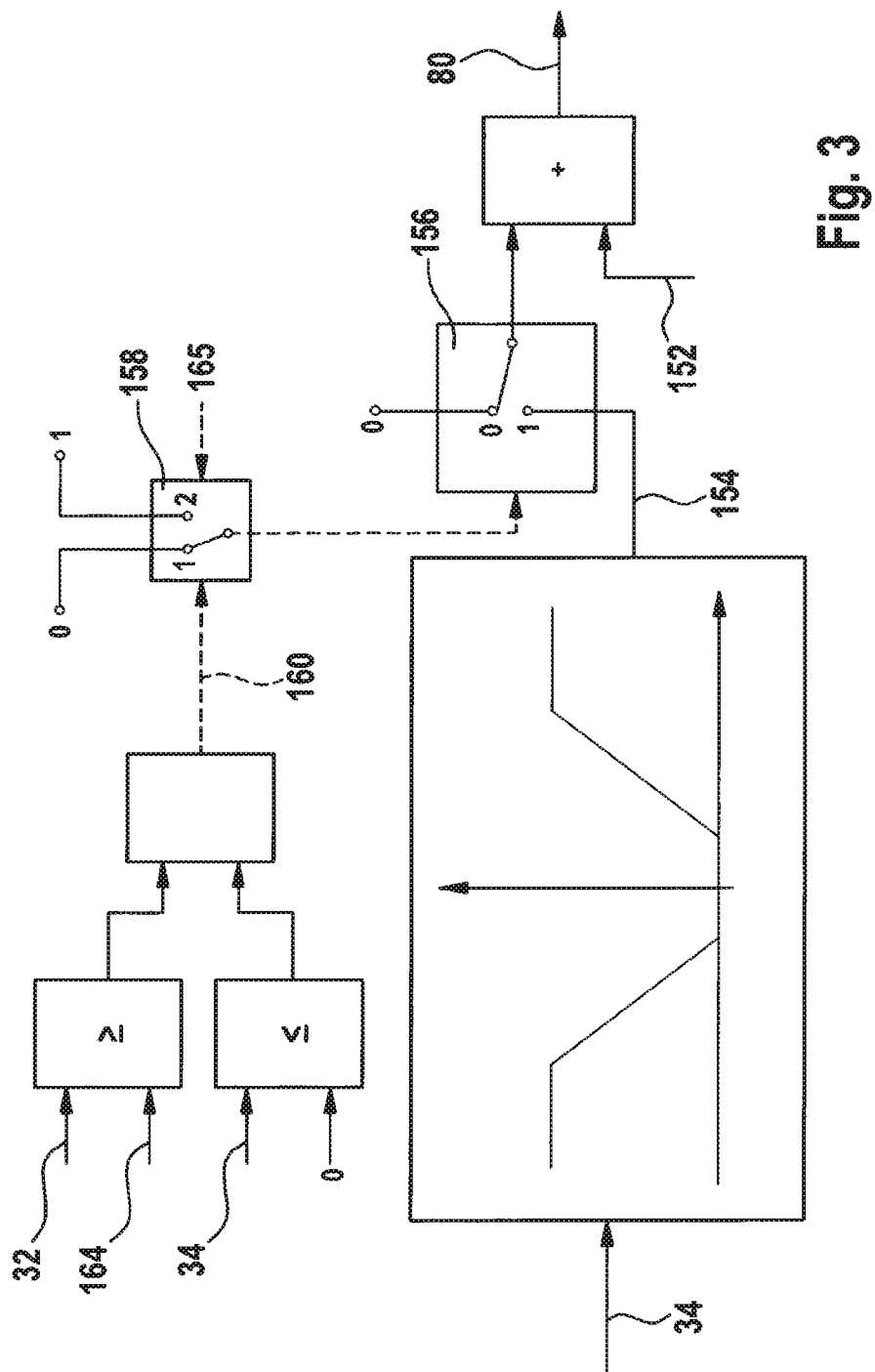
FIG. 3 shows the calculation of a dynamic proportional coefficient.

FIG. 3 depicts the calculation of the dynamic proportional coefficient 80. The dynamic proportional coefficient 80 is calculated additively from the stationary proportional coefficient kpStat 152 and a component 154 which is a function of the speed control deviation 34. It is then activated if the switch 156 assumes the position 1. On the other hand, if the switch 156 assumes the position 0, the dynamic proportional coefficient 80 is identical to the stationary proportional coefficient kpStat 152.

The switch 156 assumes the position 1 if the switch 158 changes to the position 2. In this case, the switch 158 switches through a logical 1 to the switch 156, whereby it assumes the position 1. The switch 158 assumes the position 2 if the signal 160 has the logical value 1. This is then the case if the measured engine speed 32 becomes greater than or equal to the presettable activation speed 164 and the speed control deviation 34 simultaneously becomes smaller than or equal to the value 0. For the starting process of the engine, this means the following: after the engine is started, if the engine speed 32 reaches the activation speed 164, for example 1500 1/min, and if the engine speed 32 simultaneously reaches the set speed 30 (speed control deviation equal to 0), the switch 156 changes to the position 1, whereby the dynamic proportional coefficient 80 is calculated additively from the stationary proportional coefficient kpStat 152 and a component 154 which is a function of the speed control deviation 34. If an engine shutdown is detected, the logical signal 165 thus has the value 1 and the switch 158 assumes the position 1. Therefore, a logical 0 is switched through by the switch 158, so that the switch 156 assumes the position 0. In this case, the dynamic proportional value 80 is again identical to the stationary proportional coefficient kpStat 152.

The component 154 which is a function of the speed control deviation 34 is calculated as follows: if the speed control deviation 34 becomes greater than the presettable value $e^{min}_{pos}$, the additive component 154 of the dynamic proportional coefficient 80 which is a function of the speed control deviation 34 is increased linearly until the speed control deviation 34 reaches the value $e_{max}$. In the case of a further increase in the speed control deviation, the additive component 154 remains constant. On the other hand, if the speed control deviation 34 is negative and less than the presettable value $e^{min}_{neg}$, the additive component 154 is increased linearly until the speed control deviation 34 reaches the negative presettable value $e_{max}$. If the speed control deviation is further reduced, the additive component 154 in turn remains constant.

By calculating the dynamic proportional coefficient 80 as a function of the speed control deviation 34, the dynamic response of the closed-loop speed control system may be decisively improved in the case of non-stationary operations, in particular in the case of load connection and load disconnection operations, since, in the case of the occurrence of a speed control deviation, the proportional coefficient of the speed controller increases, and thus the proportional component also increases.

Figure 4:
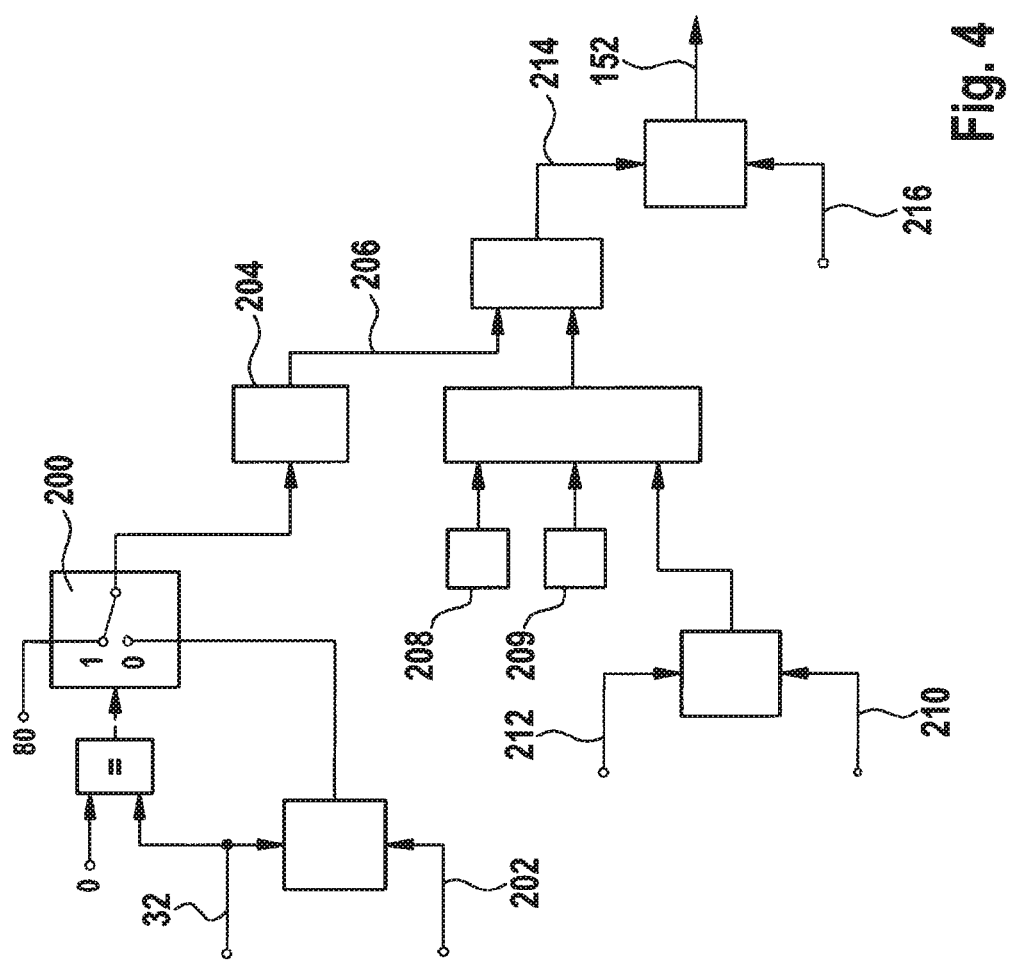
FIG. 4 shows the calculation of a static proportional coefficient.

FIG. 4 shows the calculation of the stationary proportional coefficient kpStat 152. If the engine speed $n_{actual}$ 32 is equal to 0, the switch 200 assumes the position 1, so that the value 80 is switched through. On the other hand, if the engine speed $n_{actual}$ 32 is not equal to 0, the engine speed $n_{actual}$ 32 is limited downward to the presettable value $n_{min}$ 202 and switched through by the switch 200, since it assumes the position 0 in this case. Subsequently, the reciprocal value 206 (block 204) is formed from the output value of the switch 200. This reciprocal value 206 is multiplied by the factor f 208, the closed-loop gain v 209, and the I component $E^I_{target}$ 212 which is limited downward to the presettable value $E_{min}$ 210. The result 214 of this multiplication is still limited to the presettable value kpmin 216 and constitutes the stationary proportional coefficient kpStat 152. Altogether, kpStat 152 is thus calculated as follows:

$$kpStat = (f*v*E^I_{target})/n_{actual} \qquad (1)$$

$E^I_{target} \geq E_{min}$
$n_{actual} \geq n_{min}$
kpStat≥kpmin
where f=1 (generator)
    f=2 (ship)

The I component $E^I_{target}$ must be limited downward to the value $E_{min}$, so that the stationary proportional coefficient kpStat does not become too small or equal to 0 and so that the speed controller does not have a dynamic response which is too low. In the case of a proportional coefficient of 0, the proportional component of the speed controller would no longer be active. The engine speed $n_{actual}$ must be limited downward at least to the detection limit of the engine speed; this is, for example, 80 1/min. For additional safety, kpStat is finally still limited on the whole to the lower limit value kpmin.

Alternatively, instead of the I component $E^I_{target}$ the filtered fuel energy $E_{target}^{filtered}$ 53 may be used for calculating the stationary proportional coefficient kpStat:

$$kpStat = (f*v*E_{target}^{filtered})/n_{actual}$$

where
$E_{target}^{filtered} \geq E_{min}$
$n_{actual} \geq n_{min}$
kpStat>kpmin
where
f=1 (generator)
f=2 (ship)

Equation (1) constitutes the control law of the fuel energy-based speed controller. This control law characterizes the calculation of the stationary proportional coefficient kpStat. The stationary proportional coefficient kpStat is proportional to the fuel energy $E^I_{target}$ or $E_{target}^{filtered}$ and inversely proportional to the engine speed $n_{actual}$. In this case, the proportionality factor is a product of two multipliers: the factor f and the closed-loop gain v, wherein the factor f is a function of the application and the closed-loop gain v is preset by the operator.

For deriving the control law, the engine and the system are modeled as a one-mass oscillator. If the principle of conservation of angular momentum is applied to this one-mass oscillator, the following equation is obtained for the case of the propeller drive (ship application):

$$\theta*dw/dt = M_m - k_B*n_{actual}^2$$

where
$\theta = \theta_{engine} + \theta_{load}$
$\theta$–total moment of inertia [kg m²]

w—angular velocity [1/s]
$M_m$—engine momentum [Nm]
$k_B$—proportionality factor [Nm min²]
$n_{actual}$—engine speed [1/min]

The angular velocity w is calculated as follows:

$$w = 2*pi*n_{actual}$$

The following nonlinear model of the one-mass oscillator is thus obtained:

$$\theta*2pi*dn_{actual}/dt + k_B*n_{actual}^2 = M_m$$

If this equation is linearized, the following linear model of the one-mass oscillator is obtained:

$$\theta*2*pi*d(\Delta n)/dt + 2*k_B*n_{op}*\Delta n = \Delta M_m$$

where $n_{op}$: engine speed operating point at which linearization is performed $\Delta n, \Delta M_m$: deviations of the engine speed and the engine momentum from the operating point For the transfer function of the one-mass oscillator, the following thus applies:

$$G(s) = \Delta n(s)/\Delta M_m(s) = k_m/(1+T_m*s)$$

where $$k_m = 1/(2*k_B*n_{op}) \quad (2)$$
$$T_m = (pi*\theta)/(k_B*n_{op})$$

The fuel energy $E_{target}$ per injection is related to the engine momentum $M_m$ as follows:

$$E_{target} = (pi*M_m)/(250*z*\eta)$$

where
$E_{target}$—fuel energy per injection [kJ]
$M_m$—engine momentum [Nm]
z—number of cylinders [ ]
η—efficiency [ ]

The following thus applies for the engine momentum $M_m$:

$$M_m = k_v*E_{target} \quad (3)$$

where
$k_v = (250*z*\eta)/pi$

At the operating point $(M_m^{op}, E_{target}^{op})$, the following thus applies:

$$M_m^{op} = k_v*E_{target}^{op} \quad (4)$$

For the load torque, the following applies:

$$M_L^{op} = k_B*n_{op}^2$$

The following thus applies:

$$k_B*n_{op} = M_L^{op}/n_{op} \quad (5)$$

For the gain of the engine, the following applies:

$$v_m = k_v*k_m$$

With (2), the following applies:

$$v_m = k_v*[1/(2*k_B*n_{op})]$$

With (5), the following is obtained:

$$v_m = (k_v*n_{op})/(2*M_L^{op})$$

In stationary operation, the engine momentum and load torque are identical:

$$M_m^{op} = M_L^{op}$$

The following thus applies:

$$v_m = (k_v*n_{op})/(2*M_m^{op})$$

With (4), the following applies:

$$v_m = (k_v*n_{op})/(2*k_v*E_{target}^{op})$$

The following thus applies for the stationary gain of the engine:

$$v_m = n_{op}/(2*E_{target}^{op}) \quad (6)$$

For the closed-loop gain v of the open-loop speed control system, the following applies:

$$v = kpStat*v_m$$

The following control law is thus obtained:

$$kpStat = (2*v*E_{target}^{op})/n_{op}$$

where
kpStat—stationary proportional coefficient [kJ min]
v—closed-loop gain [ ]
$n_{op}$—engine speed [1/min]
$E_{target}^{op}$—target fuel energy [kJ]

If the I component of the speed controller is used for $E_{target}^{op}$ and the measured speed $n_{actual}$ is used for $n_{op}$, the following equation is obtained for the ship application:

$$kpStat = (2*v*E_{target}^I)/n_{actual} \text{ (ship)}$$

In the case of the generator application, a linear relationship between the load torque $M_L$ and the engine speed $n_{actual}$ applies. This results in a modified multiplication factor in the control law:

$$kpStat = (v*E_{target}^I)/n_{actual} \text{ (generator)}$$

Altogether, the aforementioned control law (1) is obtained:

$$kpStat = (f*v*E_{target}^I)/n_{actual}$$

where
f=1 (generator)
f=2 (ship)
$E_{target}^I \geq E_{min}$
$n_{actual} \geq n_{min}$
kpStat>kpmin Via this control law, the closed-loop gain of the open-loop speed control system is held constant over the entire operating range. Equation (6) shows that the gain of the engine is low at low engine speed and is high at high engine speed. In the case of low fuel energy, the gain of the engine is high, and in the case of high fuel energy, i.e., high load, it is low. Since, corresponding to the aforementioned control law, a large kpStat is calculated at low engine speed and a small kpStat is calculated at high engine speed, the closed-loop gain of the open-loop speed control system is held constant overall. The same applies for the fuel energy: in the case of low fuel energy, a small kpStat is calculated, and at high fuel energy, a large kpStat is calculated, so that the closed-loop gain may be held constant overall in this case as well.

The closed-loop gain v is a presettable parameter. By increasing this parameter, the dynamic response of the closed-loop speed control system may be increased. The control law in the described form is characterized by the following features:

The stationary proportional coefficient kpStat is tracked linearly via the fuel energy.
The stationary proportional coefficient is inversely proportional to the engine speed.
The stationary proportional coefficient is proportional to the closed-loop gain v, which may be preset by the operator.
The stationary proportional coefficient is twice as large in the ship application as in the generator application.

The stationary proportional coefficient is limited downward to the presettable value kpmin.

Figure 5:
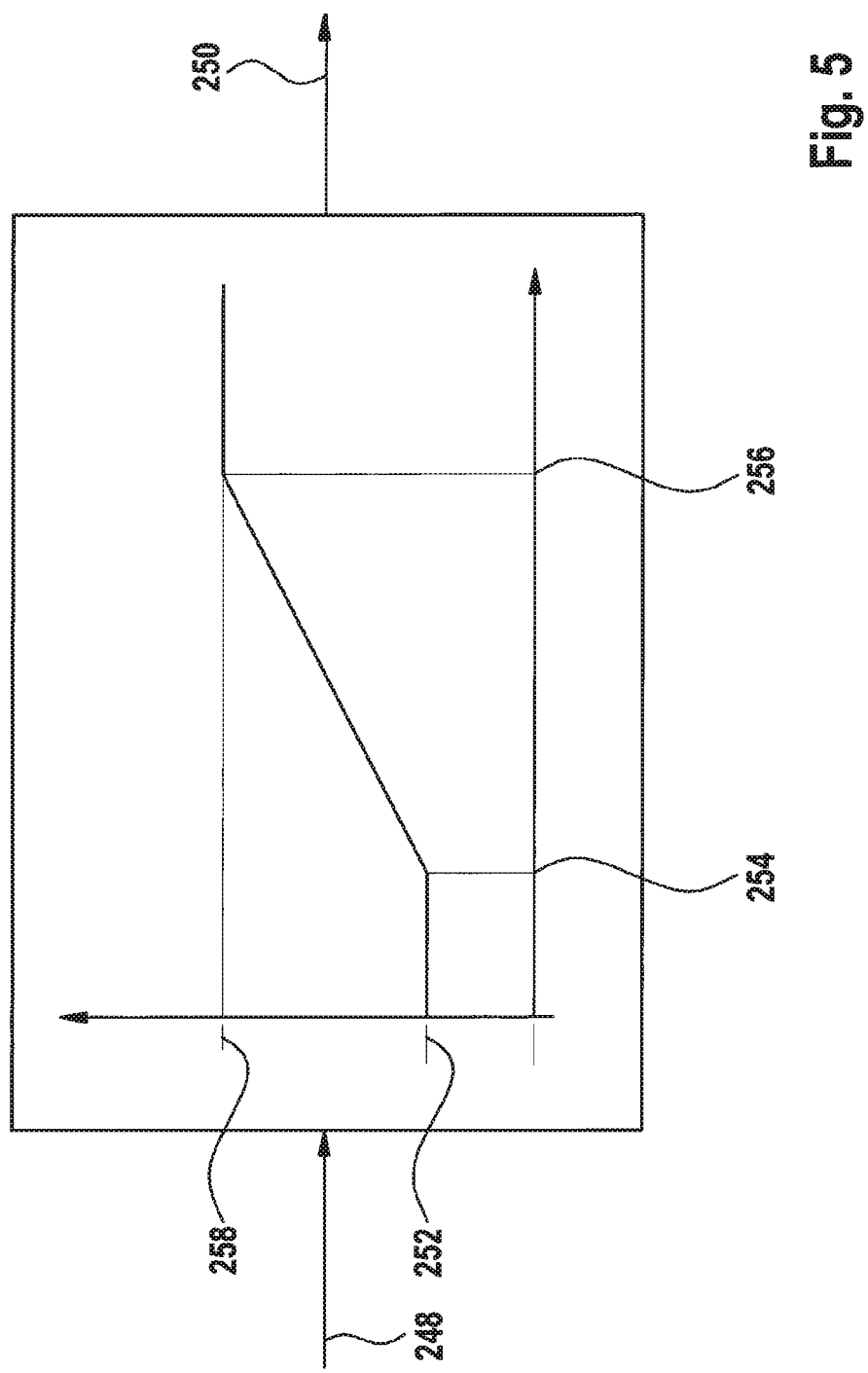
FIG. 5 shows the calculation of a rate-action time tv.

The rate-action time tv is used in FIG. 2 in order to calculate the gain 100 of the $DT_1$ component. In this case, the rate-action time tv may be constant or, as depicted in FIG. 5, may alternatively be calculated as a function of the fuel energy. In this case, either the I component $E^I_{target}$ of the speed controller, or alternatively, the filtered target fuel energy $E_{target}^{filtered}$, may be used as the fuel energy.

FIG. 5 shows the profile of the rate-action time tv 250 as a function of the fuel energy 248. The depiction shows that the rate-action time tv 250 is identical to the value $tv_{min}$ 252 if the fuel energy is less than the presettable value $E_{min}$ 254. If the fuel energy is greater than the presettable value $E_{max}$ 256, tv is identical to the value $tv_{max}$ 258. If the fuel energy is greater than $E_{min}$ 254 and less than $E_{max}$ 256, tv 250 is linearly tracked via the fuel energy 248. The values $tv_{min}$ 252 and $tv_{max}$ 258 may be preset by the operator.

FIG. 1 shows that the load signal-fuel energy 38 is added to the output 36 of the PI($DT_1$) speed controller. In this case, the load signal-fuel energy 38 constitutes a disturbance variable of the closed-loop speed control system. It has the task of improving the dynamic response of the speed controller in the case of non-stationary operations, for example, in the case of load connection and load disconnection operations.

Figure 6:
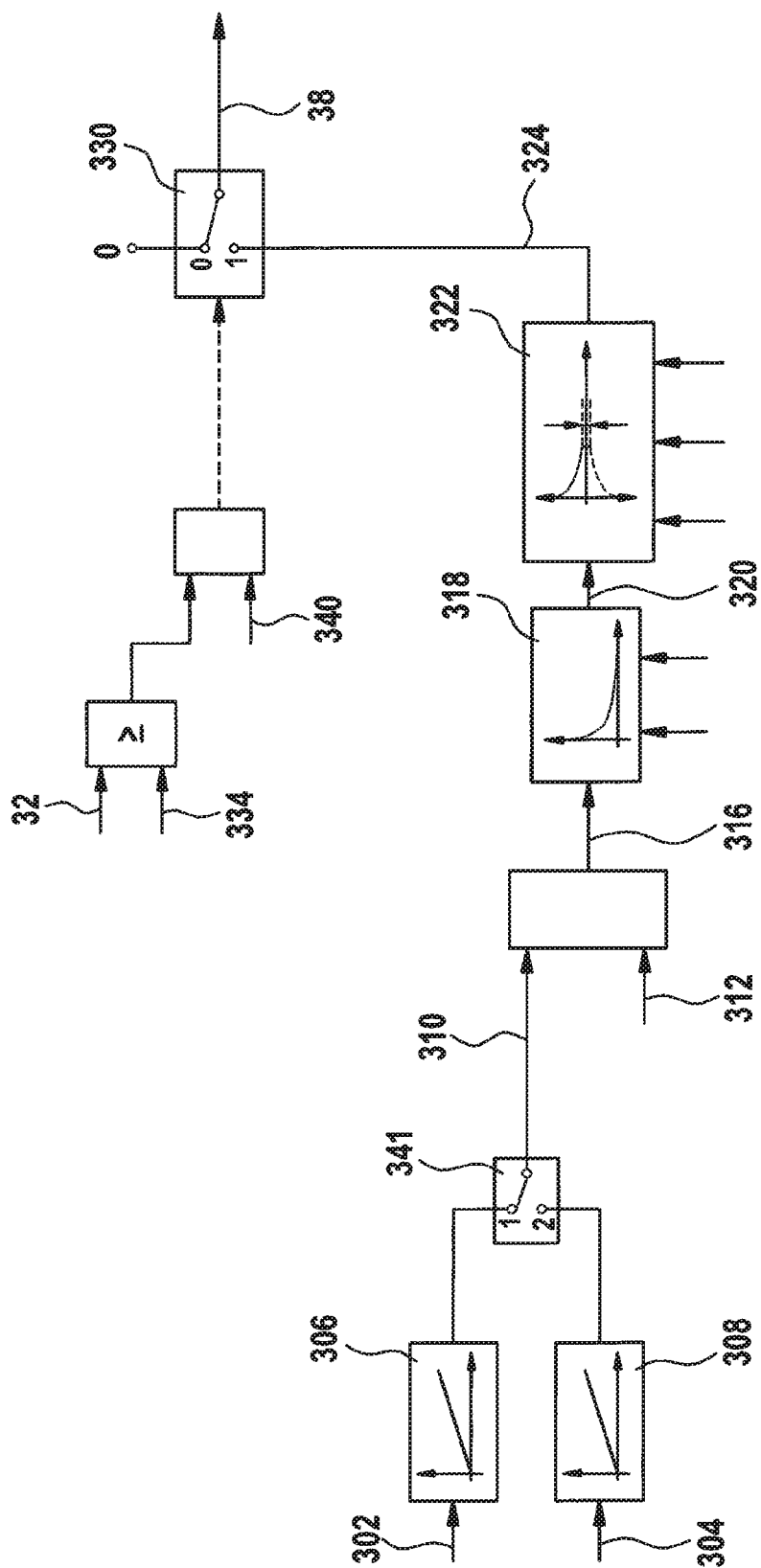
FIG. 6 shows the calculation of a load signal.

FIG. 6 shows the calculation of the load signal-fuel energy 38. The load signal-fuel energy is calculated from a system signal, in which it is, for example, a generator power signal. The system signal is provided as a 0 to 10 volt signal or a 4 to 20 mA signal by the operator of the system. If the switch 341 has the position 1, a voltage signal U (0 to 10 volts) is used; if the switch 341 has the position 2, a current signal I (4 to 20 mA) is used.

The respective input signal 302 or 304 is initially converted to percent via a two-dimensional curve 306 or 308. The signal 310 defined in percent is obtained. The presettable maximum load signal-fuel energy 312, for example, identical to the value 20,000 J, is divided by the value 100 and multiplied by this value converted into percent. The result 316 of this multiplication is now amplified by a $DT_1$ element 318. The presettable parameters of the $DT_1$ algorithm are the rate-action time $tv_{Load}$ and the delay time $t1_{Load}$. Both parameters are depicted as input variables of the block 318. The output 320 of the $DT_1$ system 318 is processed by the "hysteresis" block 322 as follows: if the output of the $DT_1$ system exceeds an upper limit value, for example 1000 J, or if it falls below a lower limit value, for example -1000 J, the output of the $DT_1$ system is switched through, i.e., activated. In this case, the output 324 of the hysteresis block is identical to the output of the $DT_1$ system. On the other hand, if the magnitude of the output of the $DT_1$ system falls below a further limit value, for example 50 J, it is switched off; i.e., in this case, the output of the hysteresis block equals 0. The limit values are depicted as input variables of the block 322.

The load signal-fuel energy 38 is identical to the output 324 of the hysteresis block 322 if the switch 330 assumes the position 1. This is the case if the engine speed 32 becomes greater than or equal to the presettable speed 334, and the "load signal active" parameter 340 is simultaneously equal to 1. This means that the load signal-fuel energy 38 is enabled if the engine speed 32 reaches the presettable speed 334 and the presettable "load signal active" parameter 340 is set to the value 1. In all other cases, the load signal-fuel energy 38 equals 0. The task of the load signal-fuel energy 38 is to support the speed controller in the case of load connection and disconnection operations. If a load is connected or disconnected in the case of a generator, the generator power thus increases or decreases. If this is detected and read in by the engine electronics as a 0 to 10 volt signal or a 4 to 20 mA signal, the signal is amplified with the aid of the $DT_1$ element and applied to the speed controller as a disturbance variable, whereby the dynamic response, i.e., the responsiveness of the closed-loop speed control system, is improved.

The invention claimed is:

1. A method for controlling speed of an internal combustion engine, comprising the steps of: injecting at least one fuel of one fuel type; providing a speed controller in a closed-loop speed control system, behavior of the speed controller being determined by controller parameters; generating a fuel energy of the at least one fuel as an output variable of the speed controller; and calculating components of the speed controller as a function of a stationary proportional coefficient, the stationary proportional coefficient being calculated proportionally to the fuel energy and inversely proportionally to the speed of the internal combustion engine, wherein an integrating component of the speed controller is calculated as a function of the stationary proportional coefficient.

2. The method according to claim 1, including calculating the components of the speed controller as a function of a dynamic proportional coefficient, wherein the dynamic proportional coefficient is also a function of a speed control deviation.

3. The method according to claim 1, wherein a proportionality factor of the stationary proportional coefficient is made up of two multipliers, wherein a first multiplier is a function of an application and has a value 2 for application as a ship, and a value 1 for application as a generator.

4. The method according to claim 3, wherein a second multiplier mirrors a loop gain, which is presettable by an operator, of an open-loop speed control system, and is independent of the application.

5. The method according to claim 2, wherein a proportional component of the speed controller is calculated as a function of the dynamic proportional coefficient.

6. The method according to claim 1, wherein a differential component of the speed controller is calculated as a function of the stationary proportional coefficient.

7. The method according to claim 6, including tracking a rate-action time linearly via the fuel energy for calculating the differential component.

8. The method according to claim 1, including adding a fuel energy load signal to an output signal of the speed controller for improving dynamic response of the speed controller.

9. The method according to claim 8, including calculating the fuel energy load signal from a system signal that is generated when load switching occurs.

10. The method according to claim 1, including injecting multiple fuels of different kinds into a cylinder in each case and combusting the fuels in a combustion operation.

11. A closed-loop speed control system for carrying out the method according to claim 1, comprising: a speed controller that generates a fuel energy as an output variable.

* * * * *